United States Patent [19]

Young

[11] Patent Number: 5,069,582

[45] Date of Patent: Dec. 3, 1991

[54] VACUUM PRODUCING DEVICE

[76] Inventor: Roger Young, 6 Holmehill La., Roseland, N.J. 07068

[21] Appl. No.: 577,320

[22] Filed: Sep. 4, 1990

[51] Int. Cl.$^5$ .............................................. B65G 53/14
[52] U.S. Cl. ...................................... 406/153; 406/194
[58] Field of Search ................. 406/153, 171, 194, 175

[56] References Cited

U.S. PATENT DOCUMENTS

| 992,144 | 5/1911 | Babcock | 239/434.5 |
| 1,528,360 | 3/1925 | Ayling | 406/153 |
| 3,099,496 | 7/1963 | Kayser | 406/194 X |
| 3,747,738 | 7/1973 | Greck | 406/31 |

FOREIGN PATENT DOCUMENTS

| 1266437 | 4/1968 | Fed. Rep. of Germany | 406/194 |
| 2854925 | 7/1980 | Fed. Rep. of Germany | 406/153 |
| 266337 | 3/1989 | Fed. Rep. of Germany | 406/171 |
| 747901 | 6/1933 | France | 406/194 |
| 2622180 | 4/1989 | France | 406/194 |
| 145031 | 7/1986 | Japan | 406/152 |
| 2005216 | 4/1979 | United Kingdom | 406/194 |

Primary Examiner—Margaret A. Focarino
Assistant Examiner—James M. Kannofsky
Attorney, Agent, or Firm—Thomas L. Adams

[57] ABSTRACT

A vacuum producing device has a hollow housing with a first end having a downstream opening therein. This downstream opening has disposed thereacross a restrictive throat. The restrictive throat has a passage therethrough extending along a passage axis. This housing has a second end with an upstream wall. A suction tube is mounted through the upstream wall in the housing. The inner end of the suction tube is centrally located in the housing. The inner end of the suction tube is also aligned with and adjacent to the restrictive throat. The housing has a lateral opening. A conduit is mounted at the lateral opening to communicate with the housing. The longitudinal axis of the conduit is oriented at an acute angle with respect to the passage axis of the throat. The conduit can be connected to a blower to be pressurized thereby. This vacuum producing device has various purposes, including removal of trim produced when cutting plastic in the form of a roll. When used to remove trim, a working hose having an outlet end is mounted with its intake end mounted adjacent to the trimming knife to remove its trim. The outer end of the suction tube connects to the working hose. Also included is a flared duct communicating with the housing and aligned downstream of its throat.

13 Claims, 3 Drawing Sheets

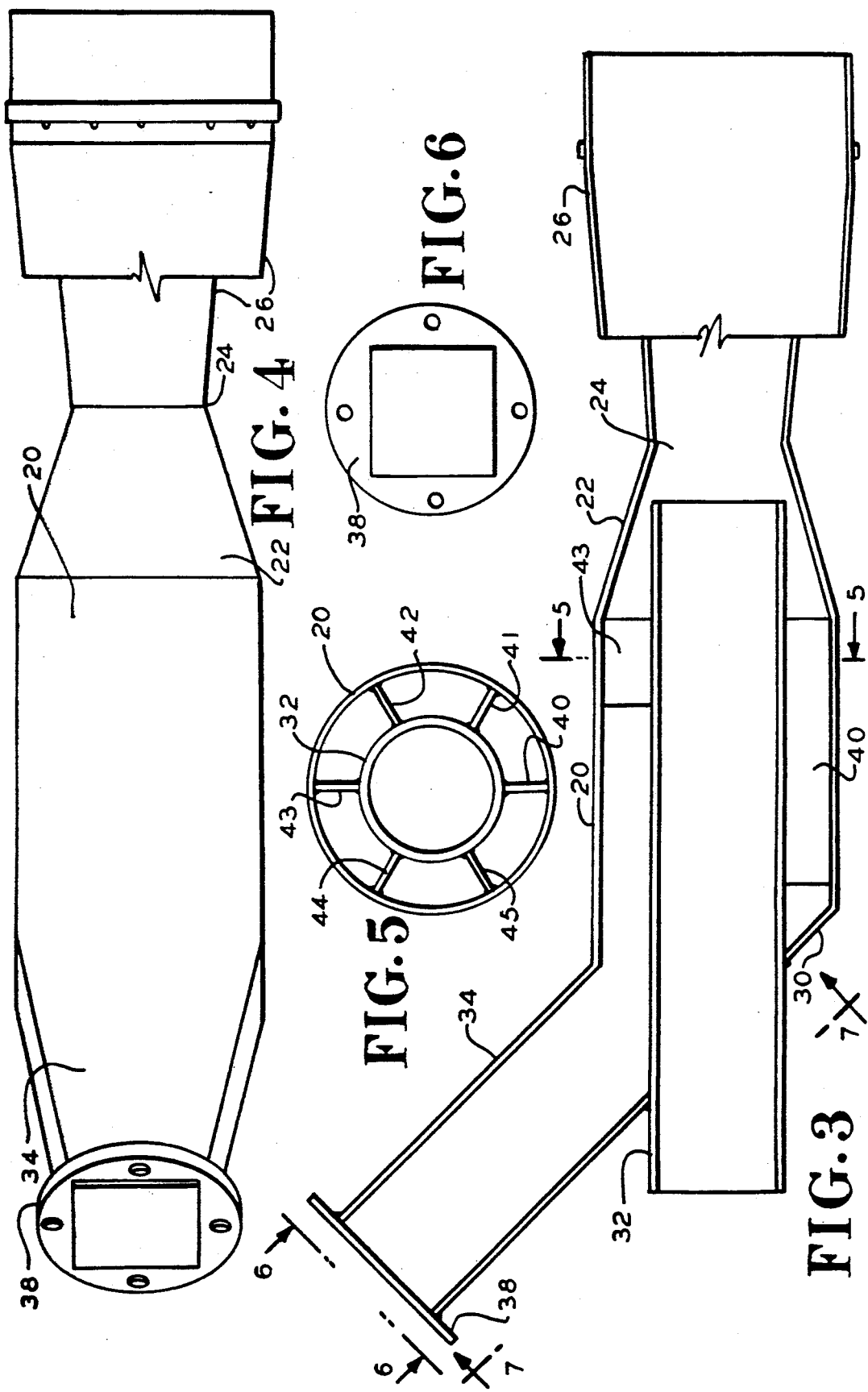

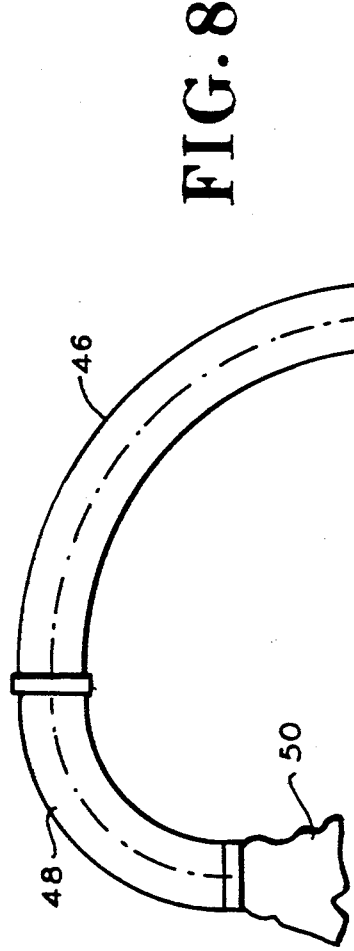
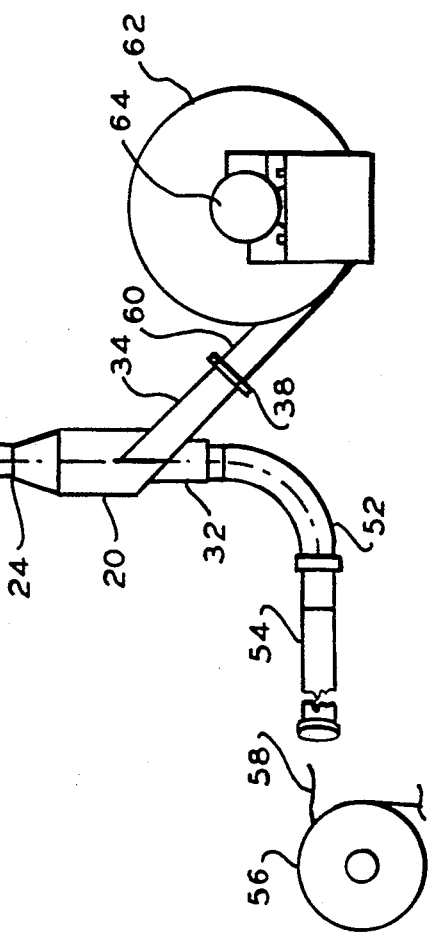
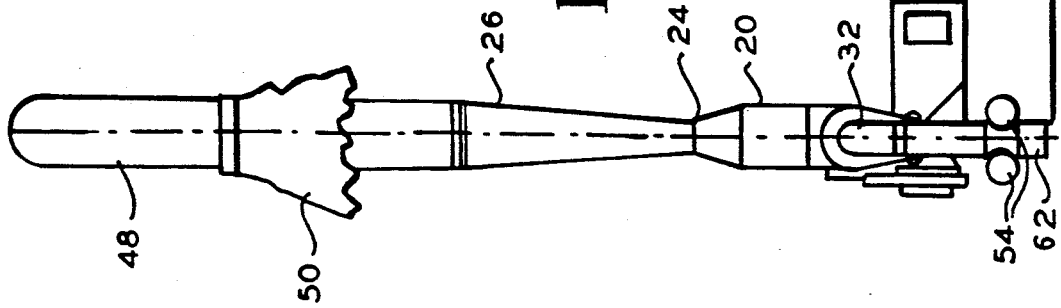

VACUUM PRODUCING DEVICE

BACKGROUND OF THE INVENTION

The present invention relates to vacuum producing devices and, in particular, to devices having a restrictive venturi throat that cooperates with a suction tube and pressurized conduit.

A vacuum producing device according to the prior art is shown in FIG. 1. There a suction tube 10 is coaxially mounted within housing 12, whose downstream end has a restrictive throat 14 communicating with a flared duct 16. A blower conduit 18 is connected at right angles to the axis of the throat 14. In a well known fashion, restrictive throat 14 produces a vacuum in tube 10. An inefficiency in the prior art design involves the necessity for turning the blower air leaving conduit 18 90°. This relatively sharp turn produces turbulence and unnecessary losses that reduce the energy available for suction through tube 10.

The vacuum producing device of FIG. 1 can be used for various purposes. One such purpose is to remove trim from plastic rolls as they are being cut to size. A blower cannot be directly connected to a suction hose that removes trim, since the trim would enter the blower and clog its impeller blades. By using a venturi as shown in FIG. 1, the trim travels along tube 10 and never enters the blower. The flared duct 16 can be connected by a pipe or other means to a bag or a container with air permeable walls to collect trim leaving tube 10.

Other known vacuum producing devices used a relatively straight vacuum line with a jet inlet at the vacuum line at an acute angle to the vacuum line. These known device were used to move materials such as grain or sand for sand blasting. Those devices did not, however, centrally locate a vacuum line within a housing aligned with a restrictive throat and flared duct to cause efficient material handling.

Known vacuum producing, venturi or related devices are shown in U.S. Pat. Nos. 3,100; 28,980; 351,854; 542,864; 688,049; 992,144; 1,116,971; 1,604,271; 1,612,838; 1,615,909; 1,686,713; 1,806,287; 1,942,048; 2,077,043; 2,111,266; 2,130,385; 2,297,681; 2,446,729; 2,584,326; 2,711,683; 2,722,372; 2,937,802; 2,951,457; 3,119,294; 3,152,839; 3,276,821; 3,378,309; 3,515,437; 3,747,738; 3,853,079; 4,253,610; 4,367,989; 4,850,752; and 4,936,031.

Accordingly, there is a need for an improved vacuum producing device that is more efficient and avoids other disadvantages of the prior art.

SUMMARY OF THE INVENTION

In accordance with the illustrative embodiments demonstrating features and advantages of the present invention, there is provided a vacuum producing device including a conduit, a suction tube and a hollow housing. The conduit has a longitudinal axis and is adapted for connection to a source of pressurized fluid. The hollow housing has a first end with a downstream opening therein. This downstream opening has disposed thereacross a restrictive throat having a passage therethrough, extending along a passage axis. The housing has a second end with an upstream wall. The suction tube is mounted through the upstream wall in the housing and has an inner end that is aligned with and adjacent to the restrictive throat. The inner end of the suction tube is also centrally located in the housing. The housing has a lateral opening. The conduit is mounted at the lateral opening to communicate with the housing. The longitudinal axis of the conduit is oriented at an acute angle with respect to the passage axis of the throat. Also included is a flared duct communicating with the housing and aligned downstream of its throat.

In a related embodiment of the same invention a trim vacuuming device can remove trim produced when cutting plastic in the form of a roll. The device has the foregoing conduit, suction tube and housing. The device also has a blower and a hose with an outlet end and an intake end, the latter mounted adjacent to the roll and its trim. The suction tube has an outer end connected to the hose. The conduit is connected to the blower to be pressurized thereby.

By employing apparatus of the foregoing type, an improved vacuum producing device is achieved. In a preferred embodiment, a hollow housing has a cylindrical midsection upstream from a frustro-conical section that terminates in the restrictive throat of a venturi. A vacuum tube is aligned with and adjacent to the throat. Preferably, a blower communicates with the hollow chamber by a conduit whose longitudinal axis is at 45° with respect to the passage through the venturi throat. In contrast to blower conduits that enter at right angles, the blower air arrives with a component of velocity already in the direction of the passage through the venturi throat. This requires less deflection of the blower air and consequently less turbulence and energy consumption from unnecessarily compressing and deflecting the air.

In this preferred embodiment, the suction tube is mounted coaxially within the hollow housing in alignment with the venturi throat. Preferably, the suction tube is mounted coaxially within the housing by a plurality of equiangularly spaced radial vanes. In a constructed embodiment, one vane that is distal to the blower conduit is longer than one or more of the vanes closer to the blower conduit. By using vanes, the apparatus is able to distribute more evenly the air entering the housing, since the air will segregate into definite channels resulting in more equal distribution throughout the housing.

The preferred embodiment can advantageously operate as a vacuum device for removing trim from plastic slitting operations performed on plastic in roll form. Since the venturi produces the vacuum, the trim does not flow through the blower impeller to cause damage.

BRIEF DESCRIPTION OF THE DRAWINGS

The above brief description, as well as other objects, features and advantages of the present invention will be more fully appreciated by reference to the following detailed description, when taken in conjunction with the accompanying drawings wherein:

FIG. 3 is an axial sectional view of a vacuum producing device in accordance with FIG. 2,;

FIG. 4 is a side view of the vacuum producing device of FIG. 3;

FIG. 5 is a sectional view taken along lines 5—5 of FIG. 3;

FIG. 6 is a view taken along lines 6—6 of FIG. 3;

FIG. 8 is a side view of the vacuum producing device of FIG. 3 connected to remove plastic trim;
and
FIG. 9 is a side view of the apparatus of FIG. 8.

DETAILED DESCRIPTION OF THE PREFERRED EMBODIMENTS

Figure 1:
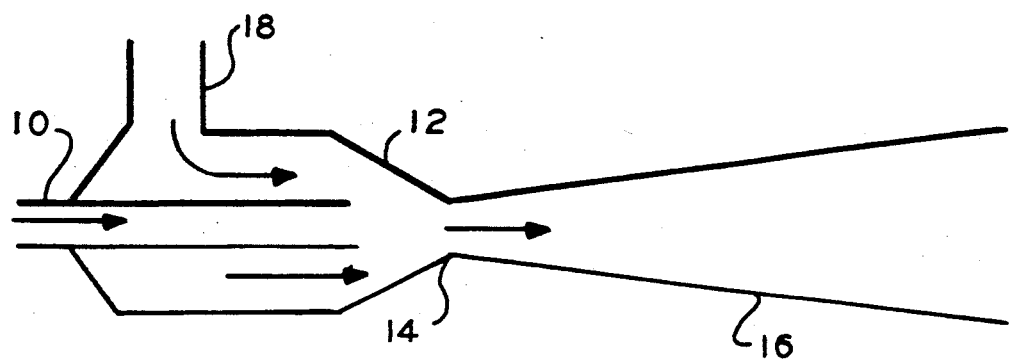
FIG. 1 is a schematic diagram of a vacuum producing device in accordance with the prior art.
Figure 2:
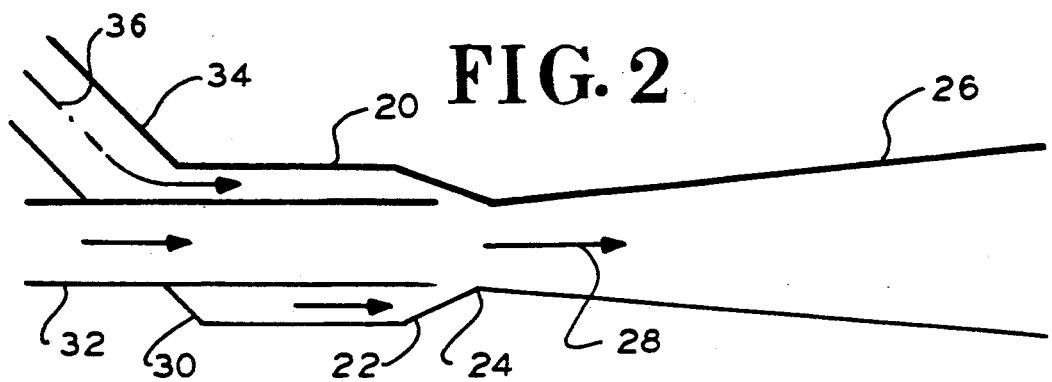
FIG. 2 is a schematic diagram of a vacuum producing device in accordance with the principles of the present invention.
Figure 7:
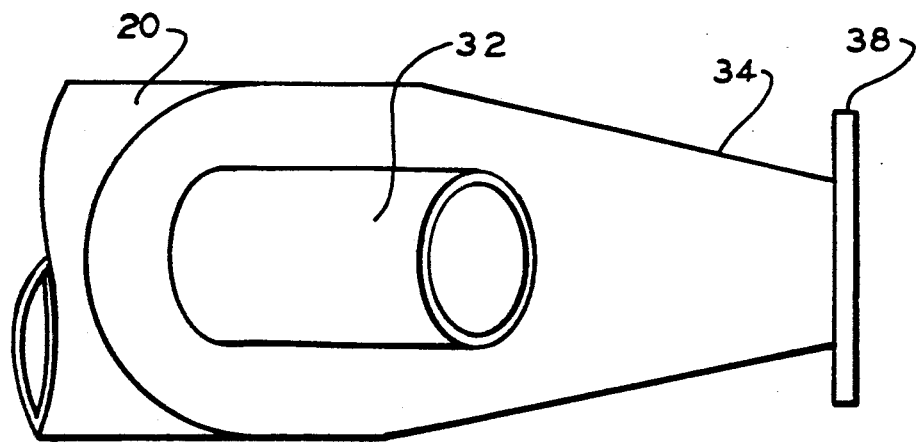
FIG. 7 is a view taken along lines 7—7 of FIG. 3.

Referring to FIG. 2, this schematic diagram shows a hollow housing 20 having a cylindrical midsection adjacent to frustro-conical section 22. Section 22 narrows to form a first end having a restrictive throat 24. Throat 24 is located upstream from a flared duct 26 having a diameter that increases away from throat 24. Throat 24, section 22 and duct 26 are aligned along a passage axis 28 that defines the direction of flow through throat 24. A second end of housing 20 has an upstream wall 30 into which is mounted a suction tube 32. Tube 32 is mounted coaxial to passage axis 28. The inner end of tube 32 is adjacent to and aligned with throat 24.

Conduit 34 is mounted through a lateral opening in housing 20. Conduit 34 has a longitudinal axis 36 that is at an acute angle with respect to passage axis 28. The angle between axes 36 and 28 is preferably less than 65° and preferably between 35° to 65°. As illustrated the angle is at 45°.

Referring to FIGS. 3-7, components illustrated schematically before are shown in more detail. In all of these drawings, corresponding components bear the same reference numerals. Housing 20 is shown again with a cylindrical midsection upstream of frustro-conical section 22 bordering restrictive throat 24. Conduit 34 is shown with a rectangular cross-section and an outer round flange 38. Suction tube 32 is mounted coaxially within housing 20 and is supported near its inner end by six equiangularly spaced vanes 40-45. Vane 40 is shown spaced distally from conduit 34. Vane 40 is almost three times as long as the other vanes 41-45. Vanes 40-45 are welded to the outside of tube 34 and to the inside of the midsection of housing 20. The outside of tube 32 at its outer end is welded about the lateral opening in housing 20.

In a constructed embodiment, the flared discharge duct 26 has an overall length of 30¾ inches. Frustro-conical section 22 is 5⅛ inches long while the restrictive throat 24 has an inside diameter of 4 inches. The cylindrical midsection of housing 20 is about 5 inches long and has an inside diameter of 7½ inches. The short vanes 41-45 are 2 inches long and the longer vane 40 is 6 inches long. Conduit 34 has an upstream opening of 4⅞ inches by 6 inches. The larger inside dimension of conduit 34 increases at downstream positions to meet the outside diameter of the midsection of housing 20. Tube 32 has an inside diameter of 4 1/16 inches. The apparatus is generally made of 14 gauge sheet steel. The spacing between the inner end of tube 32 and venturi throat 24 can be adjusted to optimize the suction through tube 32 and may be, for example, in the order of about 2 inches. It will be appreciated that all of the foregoing dimensions refer to a constructed embodiment, are therefore exemplary, and will vary for other embodiments.

Referring to FIGS. 8 and 9, previously illustrated housing 20 is mounted with its duct 26 connected to an arcuate pipe 46 having, for example, a 6 inch outside diameter and a radius of curvature of 30 inches. The arcuate pipe 46 connects at its outside end to another arcuate pipe 48 having a smaller radius of curvature (for example, 15 inches) so that pipes 46 and 48 make a 180° turn. The outlet of arcuate pipe 48 is connected to an air permeable enclosure shown herein as fabric bag 50.

Conduit 34 connects by its flange 38 to the discharge charge 60 of blower 62. Blower 32 is driven by motor 64. Previously illustrated suction tube 32 connects to an elbow pipe 52 that forks into parallel fittings that connect to a parallel pair of vacuum hoses 54. Hose 54 is shown leading to a roll of plastic 56 from which trim 58 is cut.

To facilitate an understanding of the principles associated with the foregoing apparatus, its operation will be briefly described. With motor 64 energized, blower 62 discharges air through conduits 60 and 34. Air entering through conduit 34 travels as illustrated in FIG. 2 through the midsection of housing 20. The air arriving just upstream of throat 24 along passage axis 28 is then compressed by the restriction presented by throat 24. Thereafter, the air passes into flared duct 26 and expands. In a well understood manner, a vacuum is produced in suction tube 32.

The vacuum produced in tube 32 produces a suction in both hoses 52 and 54 (FIG. 8). Plastic roll 56 can be plastic sheet material suitable for any purpose. The plastic of roll 56 is often trimmed to produce trim fragments 58, which are drawn by the vacuum through hoses 54 and 52. Significantly, the trim 58 travels through tube 32, venturi throat 24 and into flared duct 26 without entering blower 62 and causing damage. At this point, the air stream produced by blower 62 propels trim 58 through arcuate pipes 46 and 48, eventually delivering the trim fragments into bag 50. Since bag 50 is made of fabric, forced air can exit through the foraminous walls of the bag.

It is to be appreciated that various modifications may be implemented with respect to the above described preferred embodiments. For example, the fabric bag can be replaced with a relatively large box having air permeable sides. The larger box can be used to hold a relatively high weight of trim. Also, the various dimensions of the housing 20, tube 32 and conduit 34 can be altered depending upon the volume of flow and the desired pressures both positive and negative. Also, in some embodiments, the cross-sections shown as circular or rectangular can be altered to different shapes. Furthermore, the spacing between the inner end of the suction tube 32 with respect to the throat 34 can be altered depending upon the desired volume and negative pressure. In a similar fashion, the overall length and diameters of the various components can be altered depending upon the volume and pressure being handled. Moreover, the vacuum producing device shown herein can be used for various purposes and for handling and transporting materials other than trim. Indeed, the apparatus can be used in any situation where vacuum conveying is required. In addition, the components illustrated can be formed of materials other than sheet steel.

Obviously many modifications and variation of the present invention are possible in light of the above teachings. It is therefore to be understood that within the scope of the appended claims, the invention may be practiced otherwise than as specifically described.

I claim:
1. A vacuum producing device comprising:
   a conduit having a longitudinal axis and adapted for connection to a source of pressurized fluid;
   a suction tube having an inner end;

a hollow housing having a cylindrical midsection and a frustro-conical section downstream from said midsection, said housing having a first end with a downstream opening therein, said downstream opening having disposed thereacross a restrictive throat having a passage therethrough extending along a passage axis, said housing having a second end with an upstream wall, said suction tube being mounted through said upstream wall in said housing, said inner end of said suction tube being centrally located in said housing and being aligned with and adjacent to said restrictive throat, said housing having a lateral opening, said conduit being mounted at said lateral opening to communicate with said housing, the longitudinal axis of said conduit being oriented at an acute angle with respect to the passage axis of said throat;

a flared duct communicating with said housing and aligned downstream of its throat; and a plurality of equiangularly spaced, radial vanes mounted between said suction tube and said housing, a distal one of said vanes being opposite said lateral opening and longer than an adjacent one of said vanes.

2. A vacuum producing device according to claim 1 wherein said suction tube is mounted coaxially in said midsection and frustro-conical section of said housing, said inner end of said suction tube being positioned in said frustro-conical section.

3. A vacuum producing device according to claim 2 wherein said flared duct is at least as long as said frustro-conical section.

4. A vacuum producing device according to claim 3 wherein said conduit has a diverging, rectangular cross-section.

5. A vacuum producing device according to claim 1 wherein the longitudinal axis of said conduit is oriented at less than 65° with respect to the passage axis of said throat.

6. A vacuum producing device according to claim 1 wherein the longitudinal axis of said conduit is oriented at between 35° and 65° with respect to the passage axis of said throat.

7. A vacuum producing device according to claim 1 wherein the longitudinal axis of said conduit is oriented at substantially 45° with respect to the passage axis of said throat.

8. A trim vacuuming device for removing trim produced when cutting plastic in the form of a roll, comprising:

a hose having an outlet end and an intake end mounted adjacent to said roll and its trim;

a blower; and a vacuum producing device comprising:

a conduit having a longitudinal axis and connected to said blower to be pressurized thereby;

a suction tube having an inner end and an outer end connected to said hose;

a hollow housing having a first end with a downstream opening therein, said downstream opening having disposed thereacross a restrictive throat having a passage therethrough extending along a passage axis, said housing having a second end with an upstream wall, said suction tube being mounted through said upstream wall in said housing, said inner end of said suction tube being aligned with and adjacent to said restrictive throat, said housing having a lateral opening, said conduit being mounted at said lateral opening to communicate with said housing, the longitudinal axis of said conduit being oriented at an acute angle with respect to the passage axis of said throat; and a plurality of equiangularly spaced, radial vanes mounted between said suction tube and said housing, a distal one of said vanes being opposite said lateral opening and longer than an adjacent one of said vanes.

9. A trim vacuuming device according to claim 8 further comprising:

a flared duct communicating with said housing and aligned downstream of its throat; and an air permeable enclosure connected downstream to said flared duct for catching said trim.

10. A trim vacuuming device according to claim 9 further comprising:

an arcuate pipe connected between said flared duct and said air permeable enclosure, said air permeable enclosure comprising a bag.

11. A vacuum producing device according to claim 8 wherein the longitudinal axis of said conduit is oriented at less than 65° with respect to the passage axis of said throat.

12. A vacuum producing device according to claim 8 wherein the longitudinal axis of said conduit is oriented at between 35° to 65° with respect to the passage axis of said throat.

13. A vacuum producing device according to claim 8 wherein the longitudinal axis of said conduit is oriented at substantially 45° with respect to the passage axis of said throat.

* * * * *